(12) United States Patent
Wang et al.

(10) Patent No.: US 9,951,656 B2
(45) Date of Patent: Apr. 24, 2018

(54) METHOD OF EXHAUST GAS TREATMENT FOR A GAS TURBINE SYSTEM AND EXHAUST GAS TREATMENT ASSEMBLY

(71) Applicant: Ansaldo Energia IP UK Limited, London (GB)

(72) Inventors: Wuyin Wang, Växjö (SE); Vasileios Stefanis, Niederrohrdorf (CH); Julie Clavier, Baden (CH); Mirco Colombo, Zollikon (CH); Felix Guethe, Basel (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 629 days.

(21) Appl. No.: 14/493,993

(22) Filed: Sep. 23, 2014

(65) Prior Publication Data

US 2015/0089956 A1    Apr. 2, 2015

(30) Foreign Application Priority Data

Sep. 27, 2013    (EP) .................................... 13186317

(51) Int. Cl.
| | |
|---|---|
| *F01D 25/30* | (2006.01) |
| *F02C 3/28* | (2006.01) |
| *F02C 6/18* | (2006.01) |
| *F01N 3/08* | (2006.01) |
| *F01N 5/02* | (2006.01) |

(Continued)

(52) U.S. Cl.
CPC ............... *F01D 25/30* (2013.01); *F01N 3/08* (2013.01); *F01N 5/02* (2013.01); *F01N 13/002* (2013.01);
(Continued)

(58) Field of Classification Search
CPC ...... F02C 3/30; F02C 6/10; F02C 6/18; F02C 7/141; F02C 7/1435; F02C 3/34;
(Continued)

(56) References Cited

U.S. PATENT DOCUMENTS

| | | |
|---|---|---|
| 4,492,085 A | 1/1985 | Stahl et al. |
| 4,866,928 A | 9/1989 | Raiko |

(Continued)

FOREIGN PATENT DOCUMENTS

| | | |
|---|---|---|
| JP | H1193696 A | 4/1999 |
| JP | 2002205049 A | 7/2002 |

(Continued)

OTHER PUBLICATIONS

Cervantes "Environmental Technologies to Treat Nitrogen Pollution" 2009.*

(Continued)

*Primary Examiner* — William H Rodriguez
*Assistant Examiner* — William Breazeal
(74) *Attorney, Agent, or Firm* — Buchanan Ingersoll & Rooney PC

(57) ABSTRACT

The invention relates to a method for operating a gas turbine system, wherein the gas turbine system includes a compressor, a combustor, a heat recovery steam generator, a scrubber, a direct contact cooler. The method includes introducing the scrubbing fluid discharged from the scrubber into the direct contact cooler, contacting the scrubbing fluid in the direct contact cooler with the exhaust gas discharged from the heat recovery steam generator in order to remove a portion of nitrogen oxide therefrom; feeding the exhaust gas discharged from the direct contact cooler into the compressor. With the technical solution of the present invention, nitrogen oxide in the exhaust gas is reduced to a certain extent by means of used scrubbing fluid from the scrubber. This solution may improve the efficiency in reduction of nitrogen oxide with a simple and feasible manner.

20 Claims, 3 Drawing Sheets

(51) Int. Cl.
  *F01N 13/00* (2010.01)
  *F02C 6/04* (2006.01)
  *F02C 7/14* (2006.01)
  *F02C 7/16* (2006.01)
(52) U.S. Cl.
  CPC ............... *F02C 3/28* (2013.01); *F02C 6/04* (2013.01); *F02C 6/18* (2013.01); *F02C 7/14* (2013.01); *F02C 7/16* (2013.01); *F05D 2220/32* (2013.01); *F05D 2270/082* (2013.01); *Y02P 80/154* (2015.11)
(58) Field of Classification Search
  CPC ...... F02C 7/16; F02C 7/14; F02C 6/04; F02C 3/28; F01N 3/02; F01N 3/04; F01N 5/02; F01N 3/08; F01N 13/002; F23J 15/04; F23J 2215/10; F23J 2219/40; F01D 25/30; F05D 2220/32; F05D 2270/082
  See application file for complete search history.

(56) References Cited

U.S. PATENT DOCUMENTS

| | | | |
|---|---|---|---|
| 6,032,456 A | 3/2000 | Easom et al. | |
| 2009/0120088 A1* | 5/2009 | Chillar | F02C 3/34 60/605.2 |
| 2010/0251729 A1* | 10/2010 | Gutierrez | F01K 23/068 60/781 |
| 2011/0016787 A1 | 1/2011 | Dinu et al. | |
| 2011/0146282 A1* | 6/2011 | Roberts | C10G 21/20 60/690 |
| 2011/0265445 A1 | 11/2011 | Botero et al. | |
| 2012/0102913 A1 | 5/2012 | Emani et al. | |
| 2012/0192563 A1* | 8/2012 | Kauffman | F01K 25/10 60/671 |
| 2013/0091853 A1* | 4/2013 | Denton | F02C 1/007 60/772 |

FOREIGN PATENT DOCUMENTS

| | | |
|---|---|---|
| JP | 2002294257 A | 10/2002 |
| WO | 2012/094362 A2 | 7/2012 |
| WO | 2013/103990 A2 | 7/2013 |

OTHER PUBLICATIONS

EPA technical bulletin "Nitrogen Oxides (NOx) why and how they are controlled" 1999.*

Shen "Nitrogen Dioxide Absorption and Sulfide Oxidation in Aqueous Sulfide" 2011.*

* cited by examiner

METHOD OF EXHAUST GAS TREATMENT FOR A GAS TURBINE SYSTEM AND EXHAUST GAS TREATMENT ASSEMBLY

CROSS-REFERENCE TO RELATED APPLICATIONS

This application claims priority to European application 13186317.7 filed Sep. 27, 2013, the contents of which are hereby incorporated in its entirety.

TECHNICAL FIELD

The present invention relates to gas turbine, in particularly, to a method of exhaust gas treatment for a gas turbine system and exhaust gas treatment assembly.

BACKGROUND

The combustion of a fuel, such as coal, oil, natural gas, peat, waste, and the like, in a combustion plant such as a power plant, generates a hot process gas stream known as a flue gas stream. In general, the flue gas stream contains particulates and gaseous contaminants such as carbon dioxide ($CO_2$), nitrogen oxides (NOx) such as nitric oxide (NO) and nitrogen dioxide ($NO_2$), nitrous oxide ($N_2O$) and sulfur dioxide ($SO_2$). The negative environmental effects of releasing these gaseous contaminants into the atmosphere have been recognized, and have resulted in the development of processes adapted for removing or reducing the amount of such gaseous contaminants from the flue gas streams.

Various combustion modification techniques have been developed to control the formation of NOx in flue gas streams. These techniques generally have relatively low NOx reduction efficiencies and involve significant heat loss. Flue gas stream treatment technologies can achieve significantly higher removal efficiencies than combustion modification techniques. Such flue gas treatment technologies include selective catalytic reduction (SCR) and selective non-catalytic reduction (SNCR). SCR and SNCR technologies utilize ammonia or urea to carry out chemical redox reactions to reduce NOx to nitrogen ($N_2$) and water ($H_2O$). However, significant drawbacks are associated with these technologies, such as high costs, catalyst degradation, ammonia slip and facility space in the case of SCR and a narrow temperature window and ammonia slip (unreacted ammonia) in the case of SNCR. Scrubbing systems which chemically absorb NOx from a flue gas stream offer an alternative to SCR and SNCR technologies and their associated drawbacks.

Recirculation is a technology which can be employed basically for the most diverse possible purposes in gas turbines. In recirculation of exhaust gases in a gas turbine, a substantial fraction of the exhaust gas is branched off from the overall exhaust gas substream and is normally delivered again, after cooling and purification, to the mass entry stream of the turbine or to the turbine compressor. The exhaust gas composition differs considerably from the composition of fresh ambient air. Conventionally, the recirculated exhaust gas substream is mixed with fresh air from the surroundings and this mixture is subsequently delivered to the compressor.

A gas treatment system is disclosed in WO2013103990A2, which includes a heat exchanger having a first side and a second side separated from one another. The first side defines a first inlet and a first outlet and the second side defines a second inlet and a second outlet. A direct contact cooler is in fluid communication with the first outlet, a direct contact heater is in fluid communication with the first inlet and/or a gas polisher is in fluid communication with the first inlet and the first outlet. The gas treatment system includes an ammonia polishing system in fluid communication with the second inlet and/or the second outlet. A possibility to suppress such oscillations consists in attaching damping devices, such as quarter wave tubes, Helmholtz dampers or acoustic screens.

An apparatus for reducing emissions and method of assembly is disclosed in US 20120102913 A1, wherein A heat recovery steam generator (HRSG) is coupled to a gas turbine engine that discharges a flow of exhaust gases including oxides of nitrogen (NOx). The HRSG includes a steam-based heating element for heating the exhaust gases, and at least one NOx reduction element coupled downstream from the at least one steam-based heating element and configured to facilitate reducing an amount of NOx in the exhaust gases that are channeled into the at least one NOx reduction element.

A method for applying ozone NOx control to an HRSG for a fossil fuel turbine application is disclosed in WO 2012094362 A3, wherein a method for reducing NOx and recovering waste heat from a stream of exhaust gas from a fossil fuel fired turbine includes contacting the stream of exhaust gas between an economizer and an evaporator with ozone gas to convert the NO to nitrogen dioxide ($NO_2$) thereby forming a stream of exhaust gas comprising $NO_2$ and residual NO. The method further includes, contacting the stream of exhaust gas comprising $NO_2$ and residual NO with water mist to create an exhaust stream comprising nitric acid ($HNO_3$) and residual NO. The method further includes cooling the stream of exhaust gas comprising $HNO_3$ and residual NO, collecting a first residual water film on a first condensing medium to capture the $HNO_3$ and removing the first water film and $HNO_3$.

Even though great development has been achieve in this field, there still need further space to explore possible approaches to reduce NOx in the exhaust gas with lower cost and higher efficiency.

SUMMARY

It is an object of the present invention is to provide a method for operating a gas turbine system, wherein the gas turbine system comprises a compressor for compression of inlet air, a combustor for combustion of a fuel gas with compressed inlet air to form an exhaust gas, a heat recovery steam generator for collecting a portion of the exhaust gas, a scrubber for scrubbing the fuel with a scrubbing fluid before it is fed into the combustor, a direct contact cooler for cooling the exhaust gas discharged from the heat recovery steam generator with a cooling fluid, comprising: introducing the scrubbing fluid discharged from the scrubber into the direct contact cooler, contacting the scrubbing fluid in the direct contact cooler with the exhaust gas discharged from the heat recovery steam generator in order to remove a portion of nitrogen oxide therefrom; feeding the exhaust gas discharged from the direct contact cooler into the compressor.

According to one example embodiment of the present invention, the gas turbine system further comprises a cooling tower to providing cooling for the direct contact cooler by means of the cooling fluid, and the method further comprises: introducing the cooling fluid discharged from the cooling tower into the direct contact cooler.

According to one example embodiment of the present invention, the gas turbine system further comprises a heat exchanger for providing cooling for the direct contact cooler.

According to one example embodiment of the present invention, the method further comprises: introducing a reagent for removing nitrogen oxide into the direct contact cooler.

According to one example embodiment of the present invention, the method further comprises: introducing an oxidant for oxidizing nitrogen oxide into the direct contact cooler.

According to one example embodiment of the present invention, the method further comprises: introducing a pH control reagent into the direct contact cooler.

According to one example embodiment of the present invention, the reagent comprise at least one of Fe(II), EDTA, NTA and DPTA.

According to one example embodiment of the present invention, the oxidant comprises at least one of hydrogen peroxide, ozone and plasma.

According to one example embodiment of the present invention, the pH control reagent comprises at least one of NaOH, NaHCO3 and Na2CO3.

In another aspect of the present invention, an exhaust gas treatment assembly for a gas turbine system is provided, wherein the gas turbine system comprises a compressor for compression of inlet air, a combustor for combustion of a fuel gas with compressed inlet air to form an exhaust gas, the assembly comprises: a heat recovery steam generator for collecting a portion of the exhaust gas; a scrubber for scrubbing the fuel gas with a scrubbing fluid before it is fed into the combustor, a direct contact cooler for cooling the exhaust gas discharged from the heat recovery steam generator with a cooling fluid, wherein the scrubber is fluidly connected with the direct contact cooler in order to introduce the scrubbing fluid discharged from the scrubber into the direct contact cooler, the heat recovery steam generator is fluidly connected with the direct contact cooler in order to contact the scrubbing fluid in the direct contact cooler with the exhaust gas discharged from the heat recovery steam generator to remove a portion of nitrogen oxide therefrom; the direct contact cooler is fluidly connected with the compressor to feed the exhaust gas discharged from the direct contact cooler into the compressor.

According to one example embodiment of the present invention, the assembly further comprises: a reagent supply device for introducing a reagent for removing nitrogen oxide into the direct contact cooler; an oxidant supply device for introducing an oxidant for oxidizing nitrogen oxide into the direct contact cooler, a pH control reagent supply device for introducing a pH control reagent into the direct contact cooler.

According to one example embodiment of the present invention, the assembly further comprises: a cooling tower to providing cooling for the direct contact cooler by means of the cooling fluid, which is fluidly connected with the direct contact cooler to introduce the cooling fluid discharged from the cooling tower into the direct contact cooler.

According to one example embodiment of the present invention, the assembly further comprises: a heat exchanger for providing cooling for the direct contact cooler.

With the technical solution of the present invention, nitrogen oxide in the exhaust gas is reduced to a certain extent by means of used scrubbing fluid from the scrubber. This solution may improve the efficiency in reduction of nitrogen oxide with a simple and feasible manner.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

DETAILED DESCRIPTION

Figure 1:
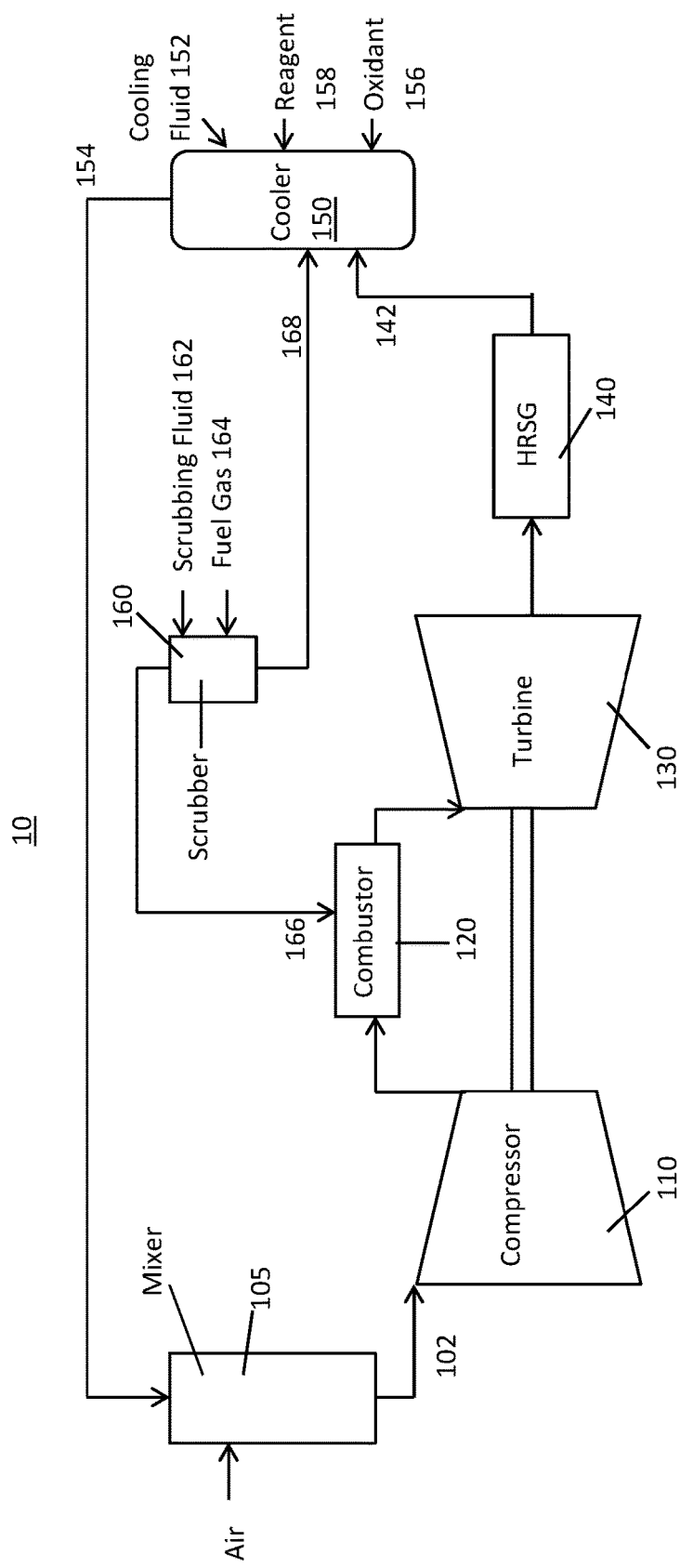
FIG. 1 shows a schematic view of a gas turbine system with exhaust gas treatment according to one embodiment of the present invention.

FIG. 1 shows a schematic example of a gas turbine system 10 with exhaust gas treatment according to one example embodiment of the present invention. Gas turbine system 10 comprises a compressor 110 for compression of inlet air, a fluidly connected combustor 120 for combustion of a fuel gas with the compressed inlet air to form an exhaust gas, and a fluidly connected turbine 130 for expansion of the exhaust gas to drive a load. The gas turbine system 10 further comprises a heat recovery steam generator(HRSG) 140 for collecting at least a portion of the exhaust gas discharged from the turbine 130, a scrubber 160 for scrubbing the fuel gas 164 with a scrubbing fluid 162, such as water, before it is fed into the combustor 120, in order to remove sulfide or other reducing sulfur compounds, a direct contact cooler 150 for cooling the exhaust gas 142 discharged from the heat recovery steam generator 140 with a cooling fluid 152, such as water. After scrubbing in the scrubber 160, the fuel gas 166 is fed into the combustor 120 for combustion.

In one example embodiment of the present invention, the scrubbing fluid 168 discharged from the scrubber 160 is introduced into the direct contact cooler 150 to contact the exhaust gas 142 in order to remove a portion of nitrogen oxide (NOx) therefrom by means of reactions between the sulfide and other reducing sulfur compound in the scrubbing fluid 168 absorbed from fuel gas. Thereafter, the exhaust gas 154 discharged from the direct contact cooler 150 is fed into the compressor 110. In one example embodiment of the present invention, the gas turbine system 10 comprises a mixer 105 to mix the exhaust gas 154 with ambient air therein. Then, the mixture 102 of the exhaust gas 154 and the ambient air in fed into the compressor 110.

In one example embodiment of the present invention, to further remove NOx and other impurities and contaminants from the exhaust gas 142, reagents 158 and oxidants 156 are introduced into the direct contact cooler 150. Regents 158 include at least one of Fe(II), EDTA, NTA and DPTA and other chelating agents with sulfite and sulfide. Oxidants 156 comprise at least one of hydrogen peroxide, ozone and plasma. It is also contemplated to introducing pH control agent into the direct contact cooler 150 to control pH of the fluid therein. The pH control agent may comprise at least one of NaOH, NaHCO3 and Na2CO3.

Figure 2:
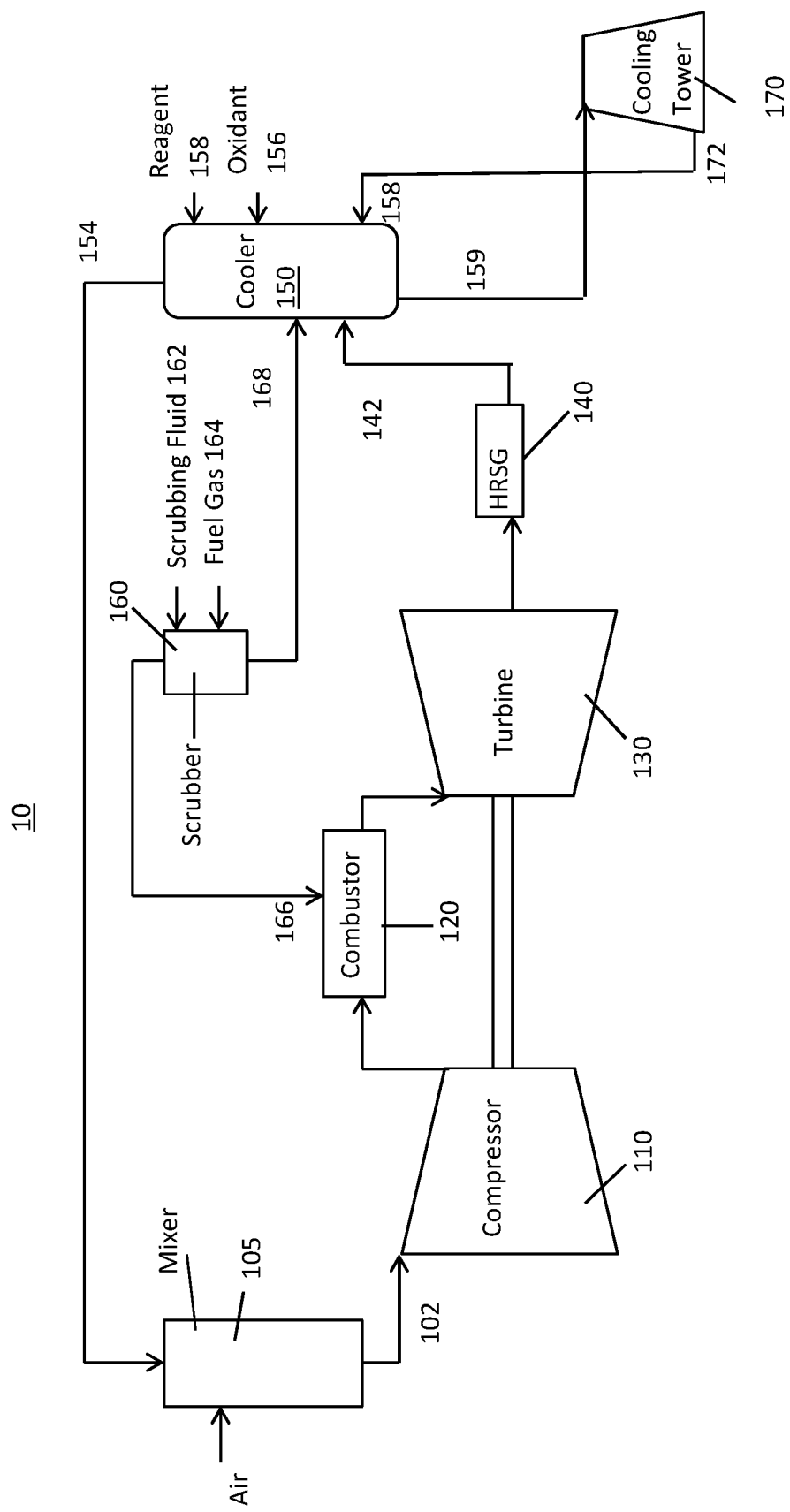
FIG. 2 shows a schematic view of a gas turbine system with exhaust gas treatment according to another one embodiment of the present invention.

FIG. 2 shows a variant of the gas turbine system 10 as shown in FIG. 1. According to one example embodiment as shown in FIG. 2, the gas turbine system 10 comprises a cooling tower 170 to providing cooling for the direct contact cooler 150 by means of the cooling fluid, such as water. The cooling fluid 172 discharged from the cooling tower 170 is introduced into the direct contact cooler 150. In another example embodiment, the cooling fluid 172 may be combined with the reagent 158 in the same supply line. The cooling fluid 159 after use in the direct contact cooler 150 may return to the cooling tower 170 for recycling.

Figure 3:
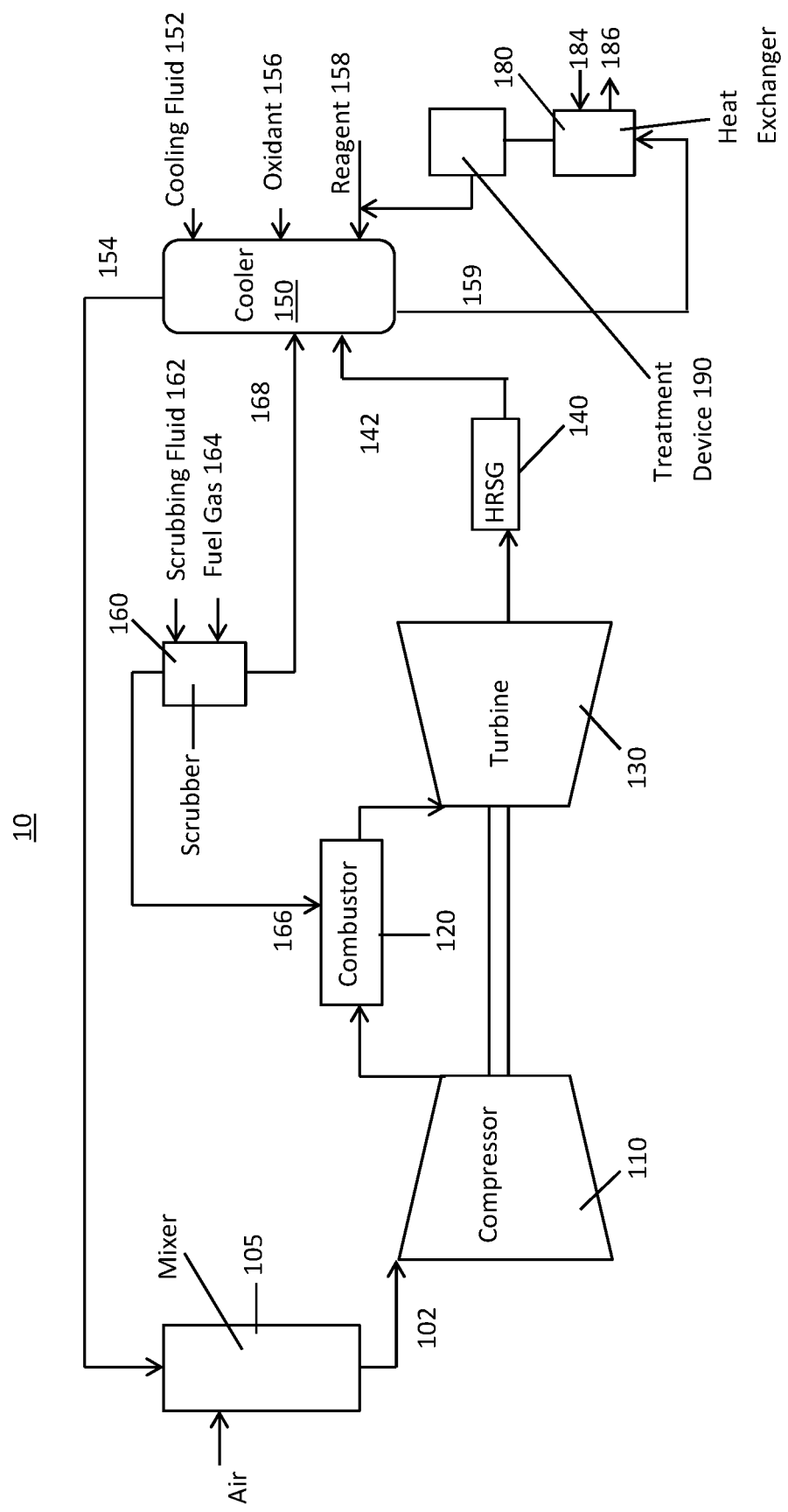
FIG. 3 shows a schematic view of a gas turbine system with exhaust gas treatment according to another one embodiment of the present invention.

FIG. 3 shows another variant of the gas turbine system 10 as shown in FIG. 1. According to one example embodiment as shown in FIG. 3, the gas turbine system 10 comprises a heat exchanger 180 for providing cooling for the direct contact cooler 150 by the cooling fluid, such as water. In this embodiment, the cooling fluid used in the direct contact cooler 150 may be separated from the cooling fluid in the cooling tower 170 as shown in FIG. 2. In FIG. 3, cooling fluid 159 after use and discharged from the direct contact cooler 150 is introduced into the heat exchanger 180 for cooling. Then the cooling fluid discharged from the heat exchanger 180 may be directly introduced into the direct contact cooler 150. Alternatively or additionally, a cooling fluid treatment device 190 may be connected downstream of the heat exchanger 180 for regenerating the cooling fluid used in the direct contact cooler 150. In this case, the cooling fluid 192 discharged from the cooling fluid treatment device 190 may be introduced into the direct contact cooler 150. As described above, the reagents 158 may be combined with the cooling fluid 192 in the same supply line. For the heat exchanger, inlet cooling fluid 184, such as water, and outlet cooling fluid 186 may be come from and exist to another cooling device, such as the cooling tower 170 shown in FIG. 2 for providing cooling for the heat exchanger 180.

As one embodiment of the present invention, an exhaust gas treatment assembly for a gas turbine system 10 is proposed. As shown in FIG. 1, the exhaust gas treatment assembly may comprise: the heat recovery steam generator 140 for collecting a portion of the exhaust gas; the scrubber 160 for scrubbing the fuel gas with a scrubbing fluid, such as water, before it is fed into the combustor 120, the direct contact cooler 150 for cooling the exhaust gas discharged from the heat recovery steam generator 140 with a cooling fluid, such as water, wherein the scrubber 160 is fluidly connected with the direct contact cooler 150 in order to introduce the scrubbing fluid discharged from the scrubber 160 into the direct contact cooler 150, the heat recovery steam generator 140 is fluidly connected with the direct contact cooler 150 in order to contact the scrubbing fluid in the direct contact cooler 150 with the exhaust gas discharged from the heat recovery steam generator 140 to remove a portion of nitrogen oxide therefrom; the direct contact cooler 150 is fluidly connected with the compressor 120 to feed the exhaust gas discharged from the direct contact cooler 150 into the compressor 120.

Even not shown, the exhaust gas treatment assembly may further comprise a reagent supply device for introducing a reagent 158 for removing nitrogen oxide into the direct contact cooler 150; an oxidant supply device for introducing an oxidant 156 for oxidizing nitrogen oxide into the direct contact cooler 150, and a pH control reagent supply device for introducing a pH control reagent into the direct contact cooler 150.

As shown in FIG. 2, the exhaust gas treatment assembly may further comprise the cooling tower 170 to providing cooling for the direct contact cooler 150 by means of the cooling fluid, which is fluidly connected with the direct contact cooler 150 to introduce the cooling fluid discharged from the cooling tower 170 into the direct contact cooler 150.

As shown in FIG. 3, the exhaust gas treatment assembly may further comprise the heat exchanger 180 for providing cooling for the direct contact cooler 150.

With the technical solution of the present invention, nitrogen oxide in the exhaust gas is reduced to a certain extent by means of used scrubbing fluid from the scrubber. This solution may improve the efficiency in reduction of nitrogen oxide with a simple and feasible manner.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. method for operating a gas turbine system, the gas turbine system including a compressor for compression of inlet air, a combustor for combustion of a fuel gas with compressed inlet air to form an exhaust gas, a heat recovery steam generator for receiving a portion of the exhaust gas, a scrubber for scrubbing the fuel gas with a scrubbing fluid before the fuel gas it is fed into the combustor, a direct contact cooler for cooling the portion of the exhaust gas with a cooling fluid after the portion of the exhaust gas is discharged from the heat recovery steam generator, the method comprising:
   introducing scrubbing fluid having sulfide absorbed from the fuel gas discharged from the scrubber into the direct contact cooler, contacting the scrubbing fluid having the sulfide with the portion of the exhaust gas the direct contact cooler receives from the heat recovery steam generator in the direct contact cooler in order to remove a portion of nitrogen oxide therefrom; and
   feeding the portion of the exhaust gas from the direct contact cooler to the compressor after the contacting of the scrubbing fluid having the sulfide with the portion of the exhaust gas is performed.

2. The method according to claim 1, wherein the gas turbine system further comprises a cooling tower providing cooling for the direct contact cooler by means of the cooling fluid, and the method further comprising: introducing cooling fluid discharged from the cooling tower into the direct contact cooler.

3. The method according to claim 1, wherein the gas turbine system further includes a heat exchanger for providing cooling for the direct contact cooler.

4. The method according to claim 1, further comprising: introducing a reagent, for removing nitrogen oxide into the direct contact cooler.

5. The method according to claim 1, further comprising: introducing an oxidant for oxidizing nitrogen oxide, into the direct contact cooler.

6. The method according to claim 1, further comprising: introducing a pH control reagent into the direct contact cooler.

7. The method according to claim 4, wherein the reagent includes at least one of Fe(II), EDTA, NTA and DPTA.

8. The method according to claim 5, wherein the oxidant includes at least one of hydrogen peroxide, ozone and plasma.

9. The method according to claim 6, wherein the pH control reagent includes at least one of NaOH, NaHCO3 and Na2CO3.

10. An exhaust gas treatment assembly for a gas turbine system, wherein the gas turbine system includes a compressor for compression of inlet air, a combustor for combustion of a fuel gas with compressed inlet air to form an exhaust gas, the assembly comprising:
 a heat recovery steam generator for collecting a portion of the exhaust gas,
 a scrubber for scrubbing the fuel gas with a scrubbing fluid before the fuel gas-is fed into the combustor,
 a direct contact cooler for cooling exhaust gas discharged from the heat recovery steam generator with a cooling fluid,
 wherein:
  the scrubber is fluidly connected with the direct contact cooler to introduce scrubbing fluid having sulfide absorbed from the fuel gas discharged from the scrubber into the direct contact cooler,
  the heat recovery steam generator is fluidly connected with the direct contact cooler so that exhaust gas discharged from the heat recovery steam generator is passable into the direct contact cooler to contact the scrubbing fluid having the sulfide absorbed from the fuel gas with the exhaust gas discharged from the heat recovery steam generator in the direct contact cooler to remove a portion of nitrogen oxide from the exhaust gas, and
  the direct contact cooler is fluidly connected with the compressor to feed exhaust gas discharged from the direct contact cooler into the compressor.

11. The exhaust gas treatment assembly according to claim 10, further comprising:
 a reagent supply conduit connected to the direct contact cooler such that reagent is introducible into the direct contact cooler to remove nitrogen oxide from the exhaust gas in the direct contact cooler;
 an oxidant supply conduit connected to the direct contact cooler such that an oxidant is introducible into the direct contact cooler to oxidize nitrogen oxide in the direct contact cooler; and
 a pH control reagent supply conduit connected to the direct contact cooler such that a pH control reagent is introducible into the direct contact cooler.

12. The exhaust gas treatment assembly according to claim 10, further comprising:
 a cooling tower to provide cooling fluid for the direct contact cooler, the cooling tower being fluidly connected with the direct contact cooler to introduce cooling fluid discharged from the cooling tower into the direct contact cooler.

13. The exhaust gas treatment assembly according to claim 10, further comprising:
 a heat exchanger for providing the cooling fluid for the direct contact cooler.

14. A method for operating a gas turbine system, the method comprising:
 passing fuel gas through a scrubber such that scrubbing fluid absorbs sulfide from the fuel gas within the scrubber prior to the fuel gas being fed to a combustor for combustion;
 discharging the scrubbing fluid having sulfide absorbed from the fuel gas to a direct contact cooler;
 contacting the scrubbing fluid having the sulfide absorbed from the fuel gas with exhaust gas in the direct contact cooler to remove nitrogen oxides from the exhaust gas;
 feeding exhaust gas from the direct contact cooler to a mixer for mixing with air to form a mixture after the exhaust gas has contacted the scrubbing fluid having the sulfide absorbed from the fuel gas; and
 feeding the mixture from the mixer to a compressor for compressing the mixture prior to feeding the mixture to the combustor for combustion of the fuel gas.

15. The method of claim 14, comprising:
 feeding at least one reagent and at least one oxidant into the direct contact cooler to facilitate removal of nitrogen oxides from the exhaust gas in the direct contact cooler.

16. The method of claim 15, further comprising:
 feeding a pH control agent into the direct contact cooler to control a pH level within the direct contact cooler.

17. The method of claim 15, comprising:
 passing exhaust gas from the combustor through a heat recovery steam generator prior to the exhaust gas being fed to the direct contact cooler.

18. The method of claim 16 comprising:
 feeding a cooling fluid into the direct contact cooler such that the cooling fluid contacts the exhaust gas in the direct contact cooler to cool the exhaust gas.

19. The method of claim 18, wherein the cooling fluid is comprised of water.

20. The method of claim 19, wherein the scrubbing fluid is comprised of water.

* * * * *